H. G. SAHLIN.
CONTROLLING MEANS FOR TURBINES.
APPLICATION FILED JULY 8, 1908.

967,444.

Patented Aug. 16, 1910.

H. G. SAHLIN.
CONTROLLING MEANS FOR TURBINES.
APPLICATION FILED JULY 8, 1908.

967,444.

Patented Aug. 16, 1910.
8 SHEETS—SHEET 4.

H. G. SAHLIN.
CONTROLLING MEANS FOR TURBINES.
APPLICATION FILED JULY 8, 1908.

967,444.

Patented Aug. 16, 1910.
8 SHEETS—SHEET 6.

WITNESSES:
M. E. Flaherty
M. D. Newman

INVENTOR:
Henning G. Sahlin
By
his attorneys.

H. G. SAHLIN.
CONTROLLING MEANS FOR TURBINES.
APPLICATION FILED JULY 8, 1908.

967,444.

Patented Aug. 16, 1910.
8 SHEETS—SHEET 7.

UNITED STATES PATENT OFFICE.

HENNING G. SAHLIN, OF MALDEN, MASSACHUSETTS, ASSIGNOR OF FORTY-FIVE ONE-HUNDREDTHS TO DAVID RICE, OF BOSTON, MASSACHUSETTS.

CONTROLLING MEANS FOR TURBINES.

967,444.
Specification of Letters Patent.
Patented Aug. 16, 1910.

Application filed July 8, 1908. Serial No. 442,446.

*To all whom it may concern:*

Be it known that I, HENNING G. SAHLIN, of Malden, in the county of Middlesex and State of Massachusetts, a citizen of the United States, have invented a new and useful Improvement in Engine-Controlling Means Especially Adapted for Turbine-Engines, of which the following is a specification.

My invention is especially adapted for use with turbine engines and particularly for such engines of the reversible type, and it includes not merely means for governing the speed of the engine but also means for starting, stopping and reversing the engine.

It will be understood by reference to the drawings, in which the best form of my invention now known to me is shown.

Figure 1 is a plan view of the valve controlling and governing mechanism, Fig. 1$^a$ being a detail explained below. Fig. 7 is a vertical section showing a portion of the governing mechanism. Fig. 7$^a$ is a section on line 7$^a$—7$^a$ of Fig. 7.

A is the base upon which the valve mechanism is mounted. The valve mechanism comprises two cylinders B, B$^1$, forming steam chambers having inlet ports $b$ and $b^1$ connected by pipes $b^2$, $b^3$ with the main steam pipe $b^4$. The passage of steam to the engine is controlled primarily by means of a shutoff valve $b^5$ of ordinary construction, of which the details are not shown other than the hand wheel by which it is operated. The cylinders B, B$^1$ are connected with the turbine (the head of which is shown at $b^8$) by pipes $b^6$, $b^7$. This turbine being reversible in character one of the pipes $b^6$ supplies steam to rotate the turbine in one direction while the other pipe $b^7$ supplies steam to rotate the turbine in the opposite direction.

Figure 8:
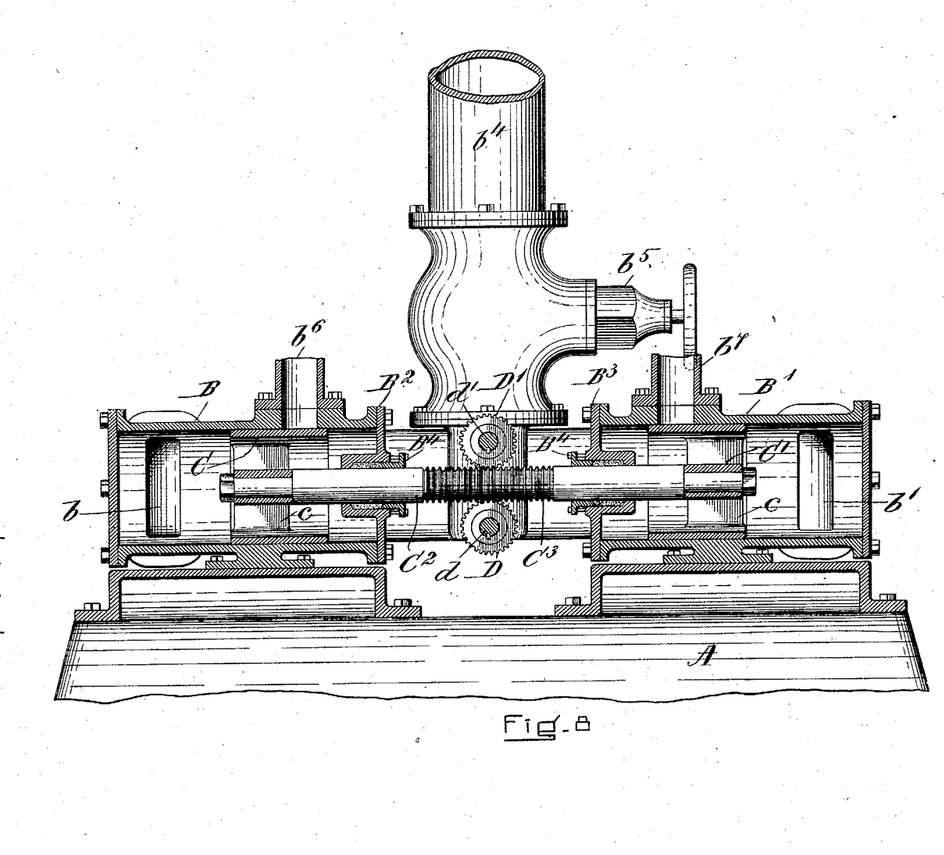
Fig. 8 is a longitudinal section through the valve mechanism.

Within the cylinders B and B$^1$ which are closed at each end are sliding throttle valves C, and C$^1$. Each of these valves is in the form of a hollow cylinder of suitable diameter to slide within the cylinders B, B$^1$, and of a length to close the ports leading to the pipes $b^6$, $b^7$ as shown in Fig. 8. The valves C, C$^1$ are connected together by a rod C$^2$, each valve being connected to the rod by a suitable spider $c$ of such character as not to interfere with the free passage of steam through the valve. The cylinders B, B$^1$ are provided with heads B$^2$, B$^3$, each carrying a stuffing box B$^4$ through which the rod C$^2$ may slide. The central portion of the rod C$^2$ has rack teeth as at C$^3$ by means of which and the pinions D, D$^1$ the valve rod may be moved, these pinions being operated by means to be hereinafter described. The valves C, C$^1$ in fact form cylindrical throttle valves which serve by their position to control the ports through which steam may be fed to either one of two turbines.

In Fig. 8 the valves are in a neutral position, that is to say, the engine is supposed to be at rest and each valve closes the outlet from its cylinder B, B$^1$. If the valves were moved to the left the valve C$^1$ would bring up against the cylinder head B$^3$ and still close the outlet through the pipe $b^7$. The valve C, however, would have moved far enough to the left to open the outlet into the pipe $b^6$ and steam would therefore pass through the pipe $b^6$ to the turbine. By moving the valves in the opposite direction until the valve C strikes the cylinder head B$^2$ the entrance to the pipe $b^6$ will be closed and the entrance to the pipe $b^7$ will be opened, thus causing the reversal of the turbine by supplying steam to its reversing nozzle. It is evident that instead of giving to the piston valves their extreme throw they may be moved only sufficiently far to partially open one of the outlets and so supply only a fraction of possible steam to one of the pipes $b^6$, $b^7$.

Each pinion D, D$^1$ is mounted on the end of a shaft $d$, $d^1$, the operation of which is controlled by the governor in a manner which will now be described.

The governor is mounted upon a base E, and the essential feature of it is a motor, the revolutions of which per minute may be under absolute control. This may be accomplished either through electrical means, that is, the motor may be an electric motor, or, as shown in the drawings, a water motor, which is supplied with water at a given pressure. In either case it is essential that the number of revolutions of the motor shall be absolutely controllable. I prefer to use a water motor for this purpose taking water from a supply having a pressure greater than that needed and employing a relief valve to reduce the pressure which reaches the motor.

Figure 4:
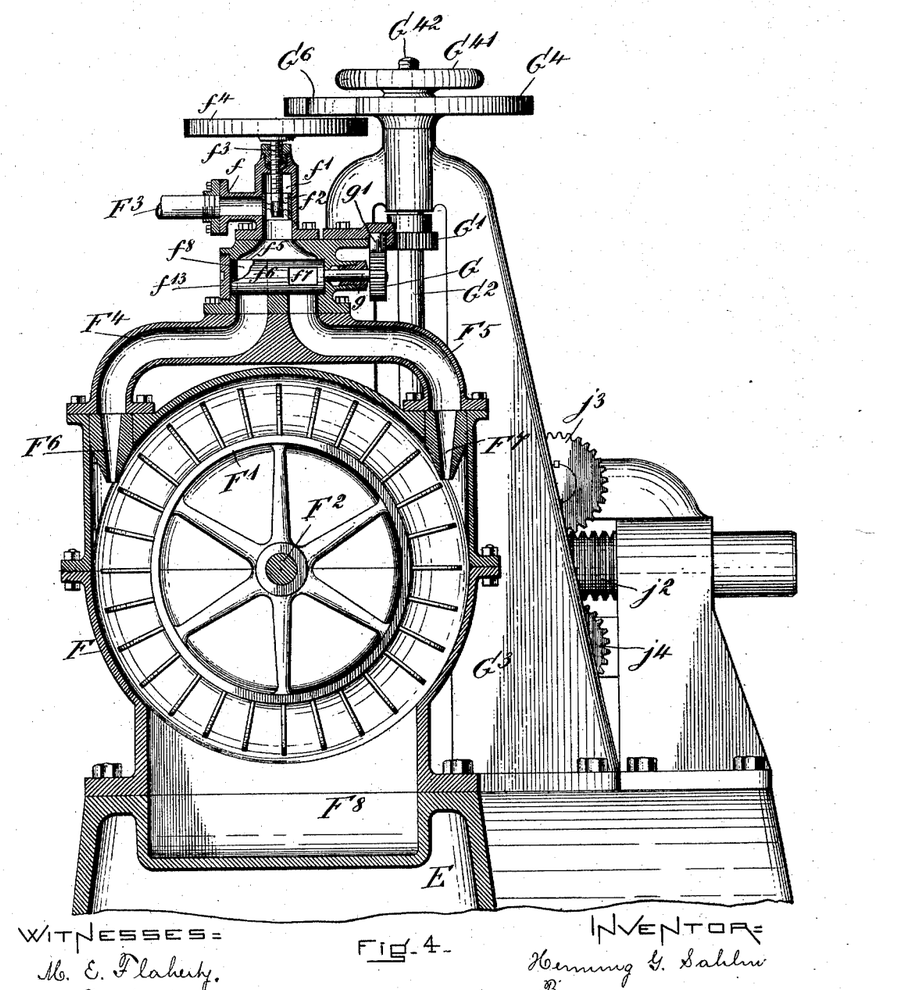
Fig. 4 is a section on line 4—4 of Fig. 1, on an enlarged scale.
Figure 5:
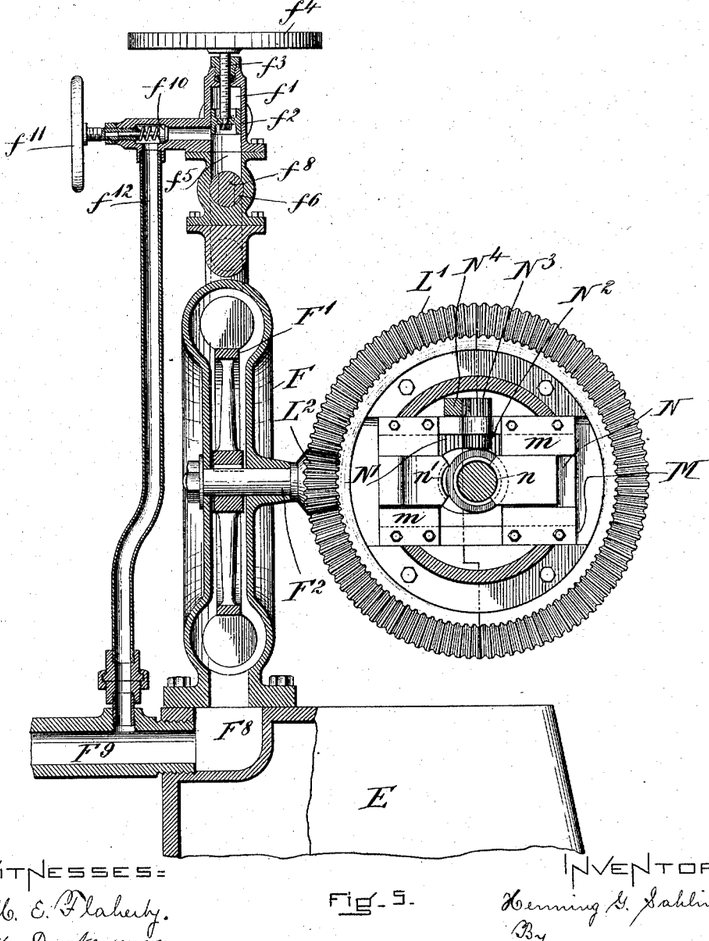
Fig. 5 is a section on line 5—5 of Fig. 6.

The motor casing is shown at F and in the chamber within it is shown a form of motor comprising a bladed wheel $F^1$ mounted on a shaft $F^2$ and fed with water under pressure from a supply pipe $F^3$. The relief valve being adjustable the water pressure will be always controllable. This supply pipe is coupled to an inlet $f$ which leads into a valve chamber $f^1$ in which is a valve $f^2$ mounted on the end of a screw $f^3$ operated by a hand wheel $f^4$. As shown in Fig. 4 the valve is represented as closing the inlet into the chamber $f^1$ and to open the valve the screw $f^3$ is turned by the hand wheel $f^4$ to lift the valve into the upper part of the chamber $f^1$. This allows the water from the pipe $F^3$ to enter the chamber $f^1$ from which it passes down into the enlargement $f^5$ of the chamber where it meets a rotary valve $f^6$. This valve is supported in bearings in the walls of the chamber $f^5$ being held therein by a screw plug $f^{13}$ and it has two ports, one of which $f^7$ is shown in Fig. 4, the other being at right angles thereto as shown at $f^8$ in Fig. 4, where a portion of the valve is broken away for the purpose, and also in dotted lines in Fig. 5.

$F^4$ and $F^5$ are passages terminating in nozzles $F^6$, $F^7$. These nozzles are located to throw a jet of water upon one side or the other of the motor $F^1$ according to the direction in which the motor is to be rotated. The outlet from the motor chamber is at $F^8$, $F^9$ being an exhaust pipe to carry off the water which has passed through the motor.

The means for controlling the water pressure and consequently the speed of the motor comprises an ordinary spring-controlled relief valve $f^{10}$ which may be regulated by the hand wheel $f^{11}$. This valve is located in a lateral extension of the chamber $f^1$ which is connected to the outlet $F^9$ by the pipe $f^{12}$. The construction of this relief valve need not be described as such valves are well known. It will be seen that if it is desired to utilize a water pressure say of eighty pounds upon the motor and to maintain that pressure constant it is only necessary to supply water to the chamber $f^1$ at a pressure above eighty pounds and set the relief valve $f^{10}$ at eighty pounds. Thus the surplus pressure of water will open the relief valve and the pressure will be relieved down to eighty pounds, the surplus water passing off through the pipe $f^{12}$ to the outlet $F^9$. A relief valve of this character may of course be adjusted to relieve any amount of pressure within certain limits and in starting my engine in the manner below described I adjust this relief valve to relieve the pressure down to a comparatively small amount so that the motor will be started up slowly. I then gradually increase the pressure upon the motor by increasing the pressure in the relief valve until finally the pressure is at the normal running pressure of the engine which for purposes of present description I have set at eighty pounds.

The valve $f^6$ carries a shaft $g$ which has at its outer end a pinion G. This pinion meshes with a rack $g^1$ which is supported in a suitable slideway and has not only teeth adapted to engage the pinion G but also teeth upon one of its sides to engage the pinion $G^1$ upon the vertical shaft $G^2$. This shaft is mounted in a bearing at the upper end of a support $G^3$, its lower end being stepped in a suitable socket (not shown) in the base E.

At its upper end the shaft $G^2$ has a hand wheel $G^4$ and it also carries what may be termed a lock nut $G^{41}$. The upper end of the shaft $G^2$ is threaded being reduced somewhat in diameter and the lock nut $G^{41}$ runs on this thread. The hand wheel $G^4$ has a bearing upon the top of the frame $G^3$ and when the hand wheel $G^4$ is set in its proper position the lock nut $G^{41}$ is turned to jam it against the top of the frame $G^3$ so that it will not be possible to turn it without releasing the lock nut $G^{41}$. It will be understood of course that the hand wheel $G^4$ is splined or otherwise attached to the shaft $G^2$ so that the two must move in unison.

Figures 1, 1A:
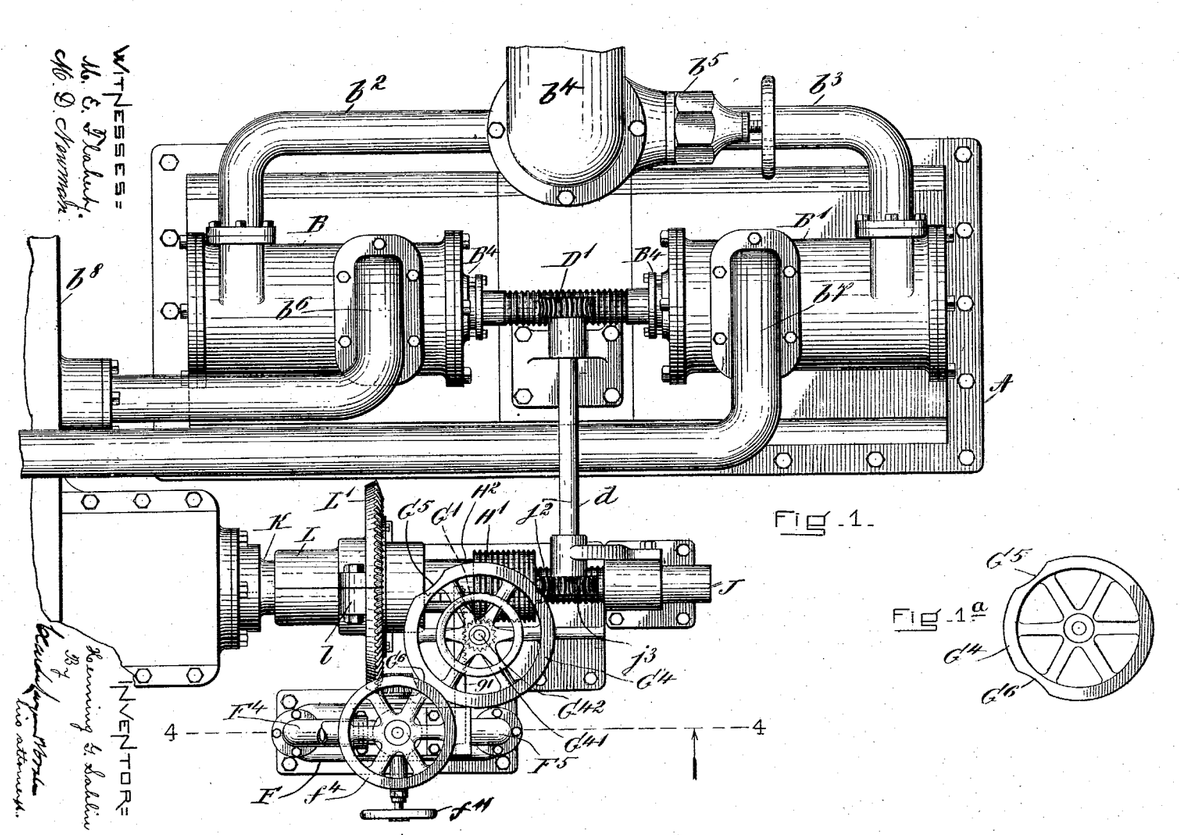
Figure 2:
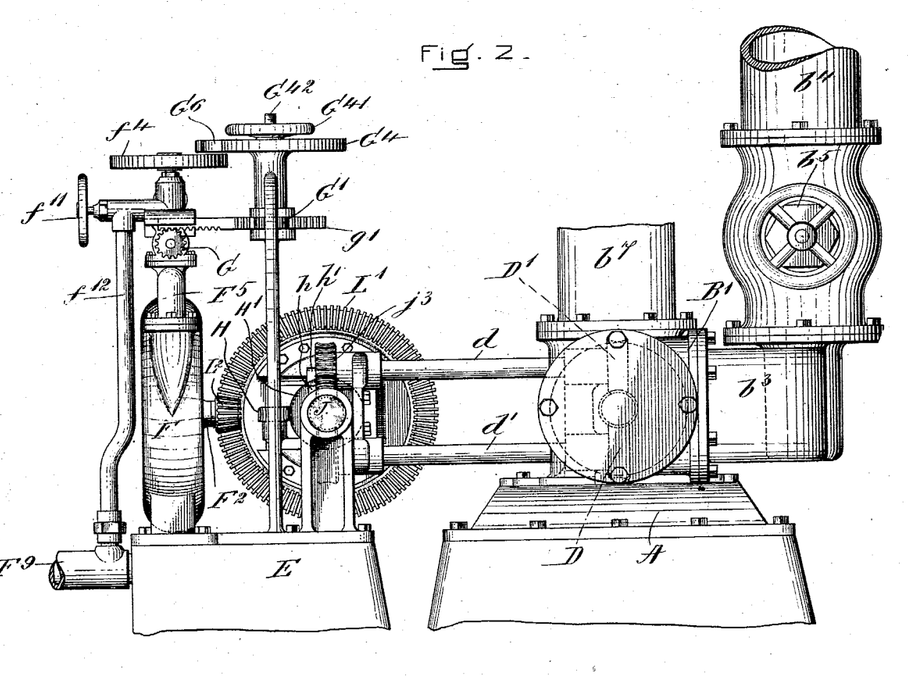
Fig. 2 is an end view of the mechanism shown in Fig. 1.
Figure 3:
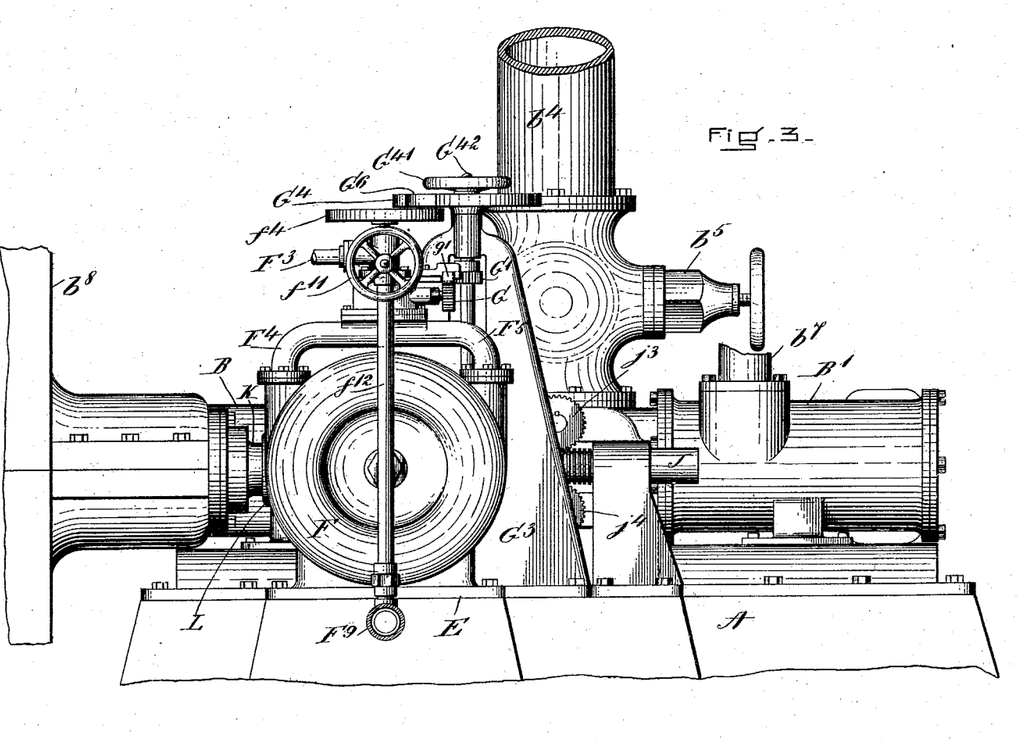
Fig. 3 is a side view looking toward the governor mechanism.
Figure 6:
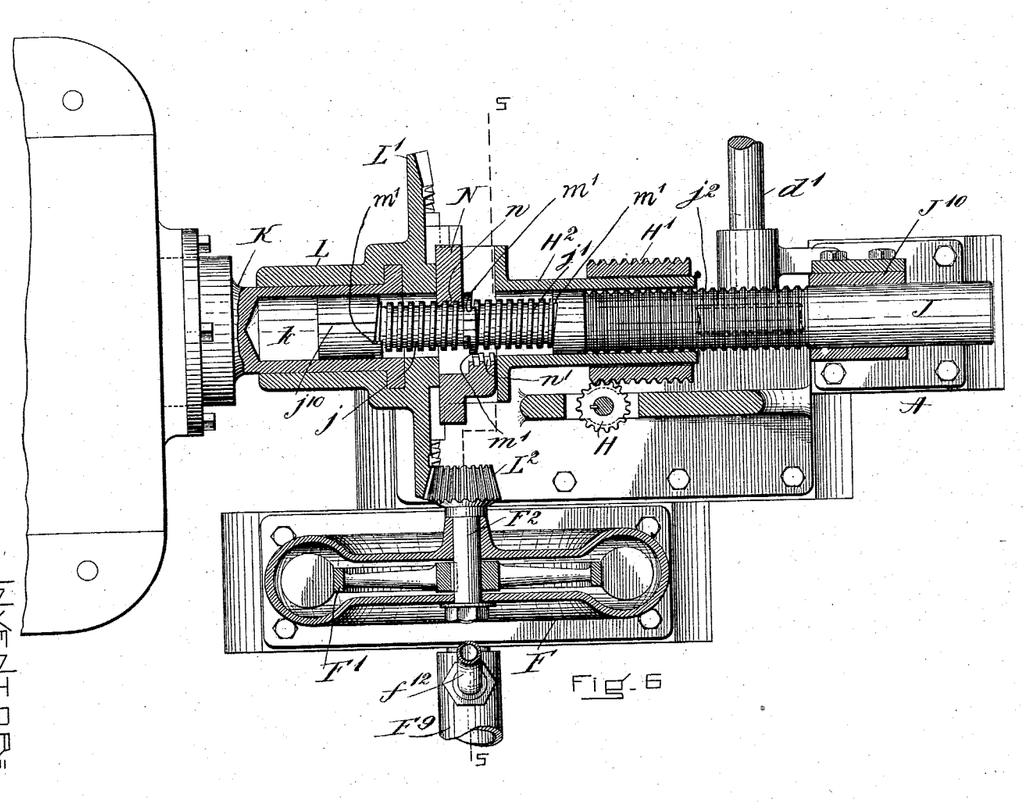
Fig. 6 is a horizontal section of the governing mechanism.

Recesses $G^5$ and $G^6$ are so located upon the periphery of the hand wheel $G^4$ and the teeth of the rack $g^1$ and the pinions G and $G^1$ are so proportioned and arranged that the valve $f^2$ can only be opened when the rotary valve $f^6$ is in position to supply water to either one of the passages $F^4$, $F^5$ and the rotary valve $f^6$ can never be turned nor can the steam be diverted from one cylinder to the other unless the water has first been shut off, and the turbine is at rest. The shaft $G^2$ also carries near its lower end a pinion H (see Figs. 2 and 6) which pinion engages a cylindrical rack $H^1$ mounted to slide on a sleeve $H^2$ mounted on the gear $L^1$. The main shaft of the turbine is marked K (see especially Figs. 6 and 7) and is hollowed from its front end inward to provide a chamber $k$ within which is contained one end of the shaft J. The outer end of the shaft J is supported to slide as well as rotate in bearings $J^{10}$ mounted on the base A. A feather $k^1$ lies in a slot $j^{10}$ in the shaft J so that the shaft J rotates with the shaft K but may be given an endwise movement in relation thereto. The shaft J is threaded as at $j$ and $j^1$ and also carries the cylindrical rack $j^2$ with which coöperate the pinions $j^3$, $j^4$ mounted on the ends of the shafts $d$, $d^1$ above referred to. It will thus be seen that the giving of an endwise movement to the shaft J causes the rotation of the pinions $j^3$, $j^4$, their shafts $d$, $d^1$ and the necessary movement to throw the piston valves from one position to another within their cylinders. Endwise motion is given to the shaft J to accomplish this result because of a difference in speed between the motor $F^1$ and the turbine shaft K in a way which will now be explained. Upon the shaft K is mounted a sleeve L which is capable of rotation independently of the shaft K. This sleeve L carries a beveled gear $L^1$ preferably made in one piece with it, the sleeve and gear, however, being constructed in two parts as is indicated by the diametric line in Fig. 5, which parts are bolted together by bolts $l$. The gear $L^1$ meshes with a pinion $L^2$ carried by the shaft $F^2$ on which the water motor is mounted so that the pinion $L^2$ gets its motion directly from the motor and transmits that motion directly to the gear $L^1$. The gear $L^1$ carries on its face a frame M having a slideway in which slides a segmental nut N, the nut being held in the slideway by gibs $m$. This nut has two sets of threads $n$ and $n^1$, one of which $n$ meshes with the threads $j$ upon the shaft J, the other set $n^1$ with the threads $j^1$ upon the shaft J, but the distance between the threads upon the opposite sides of the nut being greater than the diameter of the threads $j$, $j^1$ on the shaft J only one set of threads upon the nut can engage at a time with its corresponding threads upon the shaft. As shown in Fig. 6, for example, the threads $n$ engage the threads $j$ on the shaft J and the threads $n^1$ of the nut are out of engagement with the threads $j^1$. Thus by moving the nut N in the slide M either to one side or the other, its corresponding threads become coöperative with the threads on the shaft J. Stops $m^1$ are provided to prevent the jamming of the screws and nuts. These stops are three in number and are located on the shaft J, one at each end of the thread $j$ and the third at the middle thereof. These stops $m^1$ are enlargements of the shaft forming walls which limit the longitudinal movement of the shaft with relation to the nut. Thus the part of the nut which is engaging the threads $j$ when it reaches either end of the threads in the travel of the shaft instead of jamming brings up against one of these walls which prevents further movement of the shaft with relation to the nut. Thus the shaft is ready to start back when it is required so to do by the operation of the machine.

It will be seen that if the gear $L^1$ and the shaft J which rotates in unison with the turbine shaft K are rotating at the same rate of speed the shaft J and the shaft K will be maintained in a fixed position with relation to each other, but should there be a variation in the rotation of the turbine shaft K so that the shaft J rotates at a different speed from the nut N which is carried by the gear $L^1$ the threads $n$ or $n^1$ of the nut (whichever engage the threads $j$, $j^1$ of the shaft J) will cause the travel of the shaft J lengthwise, and by means of the pinions $j^3$, $j^4$ and their shafts $d$, $d^1$ will cause a change in the position of the piston valves C, $C^1$, such as to control, that is, either open wider or partially close whichever one of the pipes $b^6$, $b^7$, is at the time in use. By this means the governing of the speed of the turbine is controlled by the control of the amount of steam which is allowed to enter the turbine, thus controlling the pressure.

Figures 7, 7A:
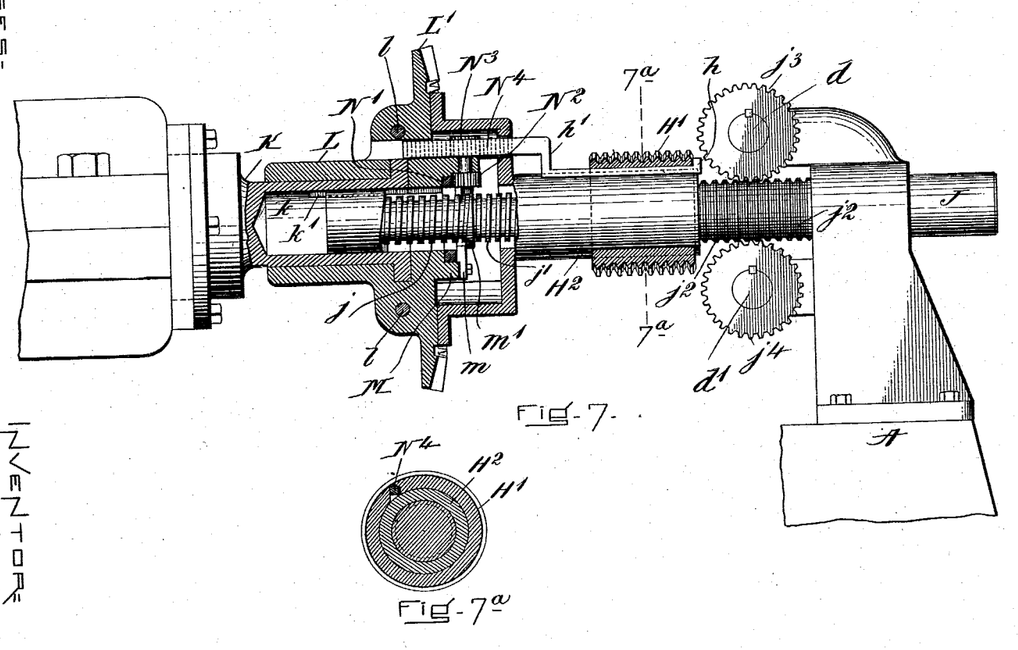

To reverse the turbine it is necessary to reverse the position of the nut N in the slide and this is accomplished in the following way. The slide N has a rack $N^1$ with which engages a pinion $N^2$ mounted on a stud carrying at its other end a pinion $N^3$. This pinion is engaged by a rack $N^4$ carried by the sleeve $H^2$. The rack $H^1$ above referred to carried by the sleeve $H^2$ is given a longitudinal movement along the sleeve by means of the pinion H on the shaft $G^2$. In Fig. 7 this rack $H^1$ is shown at one extremity of its position lying against a lip $h$. The rotation of the shaft $G^2$ and its pinion H will throw the rack into engagement with the shoulder $h^1$ by means of which the sleeve $H^2$ is connected with the rack $N^4$ and a further movement of the rack $H^1$ in the same direction will cause a movement of the sleeve $H^2$ and the rack $N^4$ such that the pinion $N^3$ will be turned and consequently also the pinion $N^2$ so that the rack $N^1$ upon the nut N will move the nut from, for example, the position shown in Fig. 6 where the threads $n$ of the nut engage with the screw $j$ into such position that the threads $n^1$ of the nut will engage the threads $j^1$ on the shaft J.

Such being a description of the details of construction of the various parts and their general relation to each other I will now describe more in detail the purpose and operation of my device.

As shown in the drawings the parts are all in the position of rest, that is to say, the water by which the motor is operated and the steam by which the turbine is operated are both shut off. It will be understood that my mechanism is effective to operate a reversible turbine in either direction. Such turbines usually comprise two wheels, one the reverse of the other, and both on the same shaft. It is a turbine of this class to which I refer and it makes no difference to which wheel the steam pipe $b^6$ or the steam pipe $b^7$ supplies the steam; one steam pipe, however, leads steam to one wheel and the other steam pipe to the other wheel.

To start the engine the steam shutoff valve $b^5$ is opened and the hand wheel $G^4$ is set so that the proper recess $G^5$ or $G^6$ is brought into position to receive the hand wheel $f^4$ when it is turned to open the valve $f^3$ leading to the water motor. The wheel $G^4$ is then locked by the lock nut $G^{41}$. This determines the direction of rotation of the turbine shaft by determining which passage is to be opened to the passage of steam. The location of the wheel $G^4$ controls the position of the valve $f^6$ and so determines in which direction the motor $F^1$ is to be rotated. If, for example, the wheel is brought to the position shown in Fig. 4, upon the opening of the valve $f^2$ by turning the hand wheel $f^4$ water will pass down through the passage $F^4$ and nozzle $F^6$ and so strike the blades on the left side of the motor wheel. This same movement of the hand wheel $G^4$ will cause also the movement of the pinion H which controls the position of the rack $H^1$. As shown in Fig. 6 this rack $H^1$ is in its farthest right hand position. The water, however, having been turned on causes the rotation of the motor which by reason of the rotation of the pinion $L^2$ causes the rotation of the gear $L^1$ which causes also the rotation of the nut N. This causes the threads $n$ to drive the shaft J to the right (see Fig. 6) and thus causes the rotation of the gears $J^3$, $J^4$, and their connected gears D, $D^1$, which in turn throw the valves C, $C^1$ to the right, thus opening the passage for steam into the pipe $b^7$ and supplying steam to the turbine to turn it.

In all cases the water should be turned on slowly in order that the steam may be supplied slowly to the turbine and the turbine start gradually. As the turbine begins its rotation it of course starts the rotation of the shaft K so that that shaft and the shaft J which is rotated by it acquires a speed which gradually catches up with the speed of the sleeve L on which the gear $L^1$ is mounted, and when the two are rotating at the same speed there will be no further relative movement of the shafts K and J, and hence no further movement of the piston valves C, $C^1$. When this situation exists it is evident that if the steam inlet is not opened wide so that the turbine is running at its full speed further water pressure may be admitted to the water motor by adjusting the relief valve so that the pressure acting on the water motor will increase and increase the speed of the motor. The lengthwise movement of the shaft J with relation to the shaft K will again begin and continue until the speed of the shaft K is equal to that of the sleeve L. Thus the engine will be gradually speeded up until full speed is acquired and thereafter any fluctuation in the movement of the turbine will be controlled because if the turbine runs too fast, that is, if the shaft K runs faster than the sleeve L which acquires a positive rate of speed from the water motor the shaft J will be drawn inward, that is, to the left and partially close the opening into the pipe $b^7$, thus allowing less steam to reach the turbine and so reducing its speed.

To reverse the engine I must first close the water supply which by reducing the speed of the sleeve L reverses the action above described and cuts off the steam. The lock nut $G^{41}$ is then turned to unlock the wheel $G^4$, thus making it possible to give a quarter turn so as to bring the other groove $G^5$ into position to receive the hand wheel $f^4$ when water is again turned on. This action of turning the hand wheel $G^4$ changes also the position of the rotary valve $f^6$ so that instead of feeding water through the nozzle $F^6$ it will feed it through the nozzle $F^7$, thus reversing the direction in which the motor rotates. This same action of turning the hand wheel $G^4$ also moves the nut N so that the threads $n^1$ engage the threads $j^1$ on the shaft J, the threads $n$ being at the same time withdrawn from engagement with the threads $j$. All the parts are then in position to be rotated in the opposite direction from before. The threads $n^1$ from this contact with $j^1$ will cause the shaft J to be moved to the left when the motor is started up, thus giving a corresponding movement to the piston valves and gradually opening the inlet to steam pipe $b^6$ which leads, for example, to the reversing wheel of the turbine. Water is then again let on to the motor in the same manner as before at a low pressure at first, the pressure gradually increasing so that the rotations of the motor increase, thus moving the steam valve gradually to gradually increase the pressure of steam in the turbine.

It will thus be seen that this device provides for the starting, stopping, reversing, and controlling of the turbine slowly by means of the governor. It, being in itself controllable within absolute limits, serves not only as a throttle but also as a controller to prevent the racing of the engine which is not only most objectionable on all occasions but also especially with an engine of the turbine character.

The turbine which it seems to me is perhaps the best to use with a governor of this kind is one of the character in which a single shaft carries two turbine wheels, one adapted to rotate the shaft in one direction and the other adapted to rotate the shaft in the other direction, the pipes $b^6$ and $b^7$ leading one to the steam chest of one of these turbines and the other to the steam chest of the other turbine.

I do not mean to limit myself to the exact details of construction above described for I am well aware that the same results may be secured by other mechanical arrangements than those shown.

While I have described my application as applicable to a turbine engine I do not mean to limit myself to that type of engine nor do I mean to limit the use of my mechanism to a steam turbine as it may be easily adapted for use with a water turbine.

I have used the term throttle valves in describing my device intending to include in that term any valve by which the steam supply may be permanently shut off from the engine.

What I claim as my invention is:

1. In a reversible power driven motor, one or more cylinders containing steam chambers, steam ports leading therefrom, throttle valves adapted to close one or both of said ports more or less, and means connecting said valves with said motor whereby the direction and speed of said motor will control the position of said valves, as described.

2. In a reversible power driven motor, one or more cylinders containing steam chambers, steam ports leading therefrom, each adapted to supply steam to its own turbine wheel, valves adapted to close one or both of said ports more or less, and means connecting said valves with said motor whereby the direction and speed of rotation of said motor will determine which port is to supply steam from said steam chambers and how much steam is to be supplied thereby, as set forth.

3. In a reversible power driven motor, one or more cylinders containing steam chambers, steam ports leading therefrom, each adapted to supply steam to its own turbine wheel, valves adapted to close one or both of said ports more or less, a shaft operated by said turbine wheels and means operated by said turbine shaft and connecting said valves with said motor whereby the direction and speed of rotation of said motor will determine which port is to supply steam from said steam chambers and how much steam is to be supplied thereby, as described.

4. In a governor, steam chambers, each steam chamber having a port and a valve controlling said port, a power-driven motor, and valve-controlling mechanism connected to and operated by said motor and adapted to operate said valves to determine from which steam chamber the constant supply of steam shall be taken and the amount of steam to be supplied.

5. In a governor, a power driven motor, steam chambers, each steam chamber having a port leading therefrom to the engine and a throttle valve controlling said port, and means operated by said motor adapted to adjust said valves to determine from which steam chamber the constant supply of steam shall be taken and the amount of steam to be supplied.

6. In combination with a governor, two cylinders, each cylinder having a port leading therefrom and a throttle valve controlling said port, said valves and said cylinders being connected, and means connected to said valves whereby their location in said cylinders with relation to said ports may be automatically adjusted to determine from which steam chamber the constant supply of steam shall be taken and the amount of steam to be supplied.

7. In combination with a governor, two cylinders, each containing a throttle valve, a rod carrying one of said valves at each end thereof, each cylinder being provided with an inlet and an outlet adapted to be closed by a valve, said rod carrying a rack and means comprising pinions and means for operating them whereby the location of said valves with relation to said inlets and outlets may be controlled, as set forth.

8. In a governor, in combination with one or more cylinders containing steam chambers and throttle valves controlling the ports thereof, a rotary motor connected with said valves and means for rotating said motor in either direction whereby the position of said valves with relation to said inlets and outlets may be adjusted to determine from which steam chamber the constant supply of steam shall be taken and the amount of steam to be supplied.

9. In a governor, in combination with a constant speed water motor, a relief valve by means of which the water pressure on said motor may be regulated, an engine shaft, a sleeve running thereon, and connections between said sleeve and said motor whereby said sleeve will run at constant speed, a shaft rotatable with said engine shaft and movable lengthwise with relation thereto, and means for so moving it, a valve chest having inlets and outlets, valves controlling said inlets and outlets, and means connecting said shaft with said valves whereby the movement of said shaft lengthwise will cause a corresponding movement of said valves, as described.

10. In a governor, an engine shaft, a sleeve rotatable thereon, means connected to said sleeve whereby it is caused to rotate at a given speed, a shaft rotatable with said engine shaft but longitudinally movable with relation thereto, said longitudinally movable shaft being threaded and said sleeve carrying a segmental nut, either segment of which is engageable with said shaft at will, and means for so engaging it, whereby said shaft may be moved lengthwise in either direction, a steam chest having ports, slide valves located therein, and means operated by the longitudinal movement of said shaft whereby the position of said valves with relation to said ports will be changed.

11. In a governor, a rotary motor and means for giving it a positive movement in either direction at a constant rate of speed, an engine shaft, a sleeve mounted on said shaft, and means connecting said sleeve and said motor whereby said sleeve will be rotated in a direction corresponding to the direction of rotation of said motor, a shaft rotatable with said engine shaft, and movable lengthwise with relation to said engine shaft, said lengthwise moving shaft being threaded along a portion of its length and said sleeve carrying segmental nuts either of which is adapted to engage the threads upon said lengthwise moving shaft, means for causing the engagement of either of said segmental nuts at will with said threads upon said lengthwise moving shaft, said means comprising a sleeve carrying a rack, and means for moving said rack, as described.

12. In a governor, in combination with two steam chambers each having ports and each having a valve adapted to control said ports, said valves being connected, means for operating said valves to close the inlet port in one of said cylinders and open the port in the other, comprising a rack, connections between said rack and said valve connections whereby the two will move simultaneously, and means for moving said rack comprising a threaded shaft connected thereto, means such as a segmental nut for operating said shaft, means for rotating said nut and means for rotating said shaft comprising an engine shaft and connections between it and said rack shaft whereby said rack shaft will rotate with said engine shaft but is movable longitudinally thereof, as described.

13. In a governor, two steam chambers, each having an inlet and an outlet port, and each chamber containing a valve adapted to control the passage of steam through said chambers, said valves being arranged whereby steam will pass through only one of said chambers at a time and the amount of steam so passing may be controlled, and means for controlling the position of said valves in their steam chambers comprising a rotatable motor, means for determining the direction of rotation of said motor comprising a shaft, a sleeve mounted on said shaft, and connected with said motor, whereby it will receive its movement from said motor, a longitudinally movable shaft carried by said engine shaft and rotatable therewith, means for causing the movement of said longitudinally movable shaft in either direction longitudinally carried by said sleeve, means for determining the direction of rotation of said motor, and means common to both longitudinally movable shaft and the direction-changing means of said motor, whereby the direction of application of power to said motor will be reversed and simultaneously the position of said longitudinally-movable shaft will be changed, as described.

14. In a governor, means for determining the direction of rotation of the engine to which it is attached, comprising two steam chambers each provided with an inlet and an outlet port, valves adapted to control the opening of said ports, and means for controlling the position of said valves and so controlling the passage of steam through said steam chambers, a motor, and means for determining the direction in which said motor shall rotate, said motor being connected with said valve operating mechanism, and means for simultaneously controlling the movement of said motor and said valves comprising a shaft carrying a recessed hand wheel and a water controlling wheel adapted to be moved into one of the recesses of said recessed hand wheel in the act of opening the water valve and thereby preventing the movement of said recessed wheel whereby the steam valves cannot be moved to reverse the engine while said motor is in operation, as described.

15. In a governor mechanism, a rotatable motor, means whereby it may be rotated in opposite directions comprising two feed pipes located on opposite sides of said motor, a common source of supply for said feed pipes, a valve controlling the inlets to said feed pipes, and an engine reversing mechanism, and means for simultaneously operating said controlling valve and said engine reversing mechanism whereby said motor and said engine will be reversed at the same movement.

16. In a governor mechanism, a motor rotatable in opposite directions, and means for so rotating it, an engine, and means for reversing it, and means for simultaneously changing the direction of rotation of said motor and the direction of operation of said engine, as described.

17. In a governor, a motor rotatable in opposite directions, and means for so rotating it, and means for controlling its speed, an engine, two steam reservoirs each connectible to said engine to supply steam thereto whereby said engine may be driven in either of two directions, and means for simultaneously changing the direction of rotation of said motor and the direction of operation of said engine, and means whereby the speed of rotation of said motor will control the quantity of steam supplied to said engine.

18. In a governor, a rotatable motor and means for rotating it at a constant speed, an engine, steam reservoirs each having an outlet, throttle valves to determine from which steam reservoir the constant supply of steam shall be taken and the amount to be supplied, and means connecting said motor, said engine and said valves whereby any variation in the speed of said engine will cause a corresponding movement of said valves, as set forth.

19. In combination, an engine, a motor adapted to be driven with a speed commensurate with the speed of the engine, means controlled in part by said engine and in part by said motor whereby the speed of the engine is regulated, and means comprising a relief valve for controlling the speed of said motor whereby the speed of said motor acting through said controlling means may control the speed of said engine.

20. In combination, an engine, a motor adapted to be driven with a speed commensurate with the speed of said engine, a governor connected to said engine and said motor, and means whereby the starting of said motor acting through said governor will cause the starting and stopping of said engine, said means comprising two steam chambers, ports leading therefrom to the engine, throttle valves one located in each steam chamber, said valves determining by their position from which steam chamber the constant supply of steam to run the engine is taken and the amount of steam to be supplied, as described.

21. In combination, an engine, a reversible motor, means controlled in part by said engine, and in part by said motor, whereby the speed of the engine may be regulated, and means whereby the direction of rotation of said motor will determine the direction of movement of said engine, said means comprising two steam chambers, ports leading therefrom to the engine, throttle valves one located in each steam chamber, said valves determining by their position from which steam chamber the constant supply of steam to run the engine is taken and the amount of steam to be supplied, as described.

22. A reversible power driven motor, an engine, one or more cylinders containing steam chambers, steam ports leading from said chambers, one adapted to lead steam to cause movement of the engine in one direction, and the other to cause movement of the engine in the opposite direction, valves adapted to close either of said ports more or less, a shaft operated by said engine and means operated by said shaft and connecting said valves with said motor whereby the direction and speed of said motor will determine which port will supply steam to move said engine and how much steam will be supplied.

23. A reversible power driven motor, a steam supply and means for controlling it comprising an engine shaft and a shaft driven by said motor, and positive connections between said shafts whereby the direction of rotation of said motor will control the direction of rotation of said engine.

24. A reversible power driven motor, a steam supply and means for controlling it comprising an engine shaft and a shaft driven by said motor, and positive connections between said shafts whereby when the speed of rotation of the motor is greater than the speed of rotation of the engine the steam supply will be increased, and vice versa.

25. A reversible power driven motor, a steam supply and means for controlling it comprising an engine shaft and a shaft driven by said motor, and positive connections between said shafts whereby when the motor is stopped the steam supply will be cut off.

26. A reversible power driven motor, a steam supply and means for controlling it comprising an engine shaft and a shaft driven by said motor, and positive connections between said shafts whereby when the motor is started steam will be admitted to operate the engine.

27. A reversible power driven motor, a steam supply and means for controlling it comprising an engine shaft and a shaft driven by said motor, and positive connections between said shafts whereby when the motor is reversed the steam supply will be directed to reverse the engine.

28. In a governor mechanism, an engine shaft, a screw carried thereby, a motor shaft, a nut adapted to be rotated thereby, and stops located on said screw to limit the travel of said nut, as set forth.

29. In a governor mechanism, an engine shaft, a screw carried thereby, a motor shaft and a split nut adapted to be rotated thereby, and means whereby either portion of said nut may be brought into operation relative with said screw, as described.

30. In a governor mechanism, an engine shaft, a screw carried thereby, a sleeve also mounted on said shaft to slide lengthwise thereon, a rack slidable on said sleeve, a motor and means for simultaneously changing the direction of rotation of said motor and the location of said rack, as and for the purposes set forth.

HENNING G. SAHLIN.

Witnesses:
M. E. FLAHERTY,
F. F. PHILLIPS, Jr.